US008009372B2

(12) United States Patent
Jin

(10) Patent No.: US 8,009,372 B2
(45) Date of Patent: Aug. 30, 2011

(54) LENS DRIVING DEVICE

(75) Inventor: Renzhao Jin, Zhejiang (CN)

(73) Assignee: Ningbo Chengli Technology Development Co., Ltd., Xiwu District, Fenghua, Zhejiang Province (CN)

(*) Notice: Subject to any disclaimer, the term of this patent is extended or adjusted under 35 U.S.C. 154(b) by 250 days.

(21) Appl. No.: 12/445,837

(22) PCT Filed: Mar. 10, 2008

(86) PCT No.: PCT/CN2008/000477
§ 371 (c)(1),
(2), (4) Date: Apr. 16, 2009

(87) PCT Pub. No.: WO2008/131637
PCT Pub. Date: Nov. 6, 2008

(65) Prior Publication Data
US 2011/0013298 A1    Jan. 20, 2011

(30) Foreign Application Priority Data

Apr. 27, 2007   (CN) .......................... 2007 1 0068340
Dec. 28, 2007   (CN) .......................... 2007 1 0300900

(51) Int. Cl.
    *G02B 7/02*    (2006.01)

(52) U.S. Cl. ........................................ 359/824; 359/814
(58) Field of Classification Search .......... 359/811–824, 359/830
See application file for complete search history.

(56) References Cited

U.S. PATENT DOCUMENTS

| 7,652,835 | B2 * | 1/2010 | Wang et al. ................... 359/824 |
| 2005/0264899 | A1 * | 12/2005 | Manabe ....................... 359/811 |
| 2006/0028320 | A1 * | 2/2006 | Osaka ........................ 340/384.1 |
| 2007/0091199 | A1 * | 4/2007 | Shiraki et al. ................ 348/345 |

* cited by examiner

*Primary Examiner* — Mohammed Hasan
(74) *Attorney, Agent, or Firm* — Global IP Services; Tianhua Gu

(57) ABSTRACT

A lens driving device comprises an annular magnet carriage acting as the outer frame of the lens driving device. A magnet and a coil are disposed in the annular magnet carriage. A lens holder with a lens is disposed in the central circular hole of the annular magnet carriage. A front spring with front gasket is disposed in front of the lens holder, and a rear springs with rear gasket is disposed in back of the lens holder. The annular magnet carriage, the front spring, the rear spring, the front gasket, the rear gasket, the lens holder, and the base are all in the shape of flat plate and nested connect with each other to form a position mechanism.

14 Claims, 2 Drawing Sheets

LENS DRIVING DEVICE

CROSS REFERENCE TO RELATED PATENT APPLICATION

The present application is a PCT application No. PCT/CN2008/000477 entering the U.S.A. national stage and claiming the priority of the Chinese patent application No. 200710068340.8 filed on Apr. 27, 2007 and Chinese patent application No. 200710300900.8 filed on Dec. 28, 2007, which applications are incorporated herein by reference.

FIELD OF THE INVENTION

The present invention relates to the field of the driving device for the lens of camera, in particular, to a kind of lens driving device especially for the mini-camera to focus, which has the ability of resisting jounce and impact. The present invention is mainly applied in the auto-focusing mini-camera, and working together with the miniature sensors with high image quality, the present invention is especially adapted to mobile telephones, computer, cars, and robots.

BACKGROUND OF THE INVENTION

The lens driving device in the present mini-camera is similar with the subject disclosed in the Chinese patent No. ZL200410017724.3 titled "Lens Driving Device". It comprises an annular magnet carriage disposed on a base, in which a magnet and a coil are disposed and a lens with lens holder which is mounted in the coil, the section of the annular magnet carriage is hollowed-U-shaped, and the magnet and the coil are disposed in magnet carriage, wherein the coil is fixed around the lens holder, while the lens holder is movably received in the annular magnet carriage. The lens driving device of above mentioned patent also comprises an annular flat front spring, an annular flat rear spring, a small cap and a frame, the outer edges of the front spring and the rear spring joint with the annular magnet carriage, the small cap makes the inner edge of the front spring being fixed on the lens holder, the frame makes the outer edge of the front spring being fixed on the annular magnet carriage.

When the coil is powered on, the electromagnetism force generated by the coil when powered on can resist with the pre-pressed the front spring and the rear spring, and makes the lens holder moving along the optical axis.

The lens driving device of above mentioned patent still comprises a vertical restricting device which is mounted in the space between the small cap and the frame to prevent the lens holder being offsetting and moving, and a rotating restricting device which is mounted in the space between the lens holder and the annular magnet carriage to prevent the lens holder being offsetting and moving.

The above mentioned lens driving device utilizes the function of magnetic induction, then, the lens holder mounted in the annular magnet carriage can move under the parallel electromagnetism force, meanwhile, the opposite resilient force is generated by the front spring and the rear spring mounted on the lens holder, when said electromagnetism force and said elastic force are in balance, the lens holder will be held in a predefined position, then, the camera can focus automatically.

For the above mentioned lens driving device, the manufacture, assembling, displacement are all required to reach high precision. Although the lens holder can be restricted so as to having the ability of resisting jounce and impact and having high image quality with no additional component, the above mentioned lens driving device still has following shortcomings:

Firstly, the space occupied by the frame restricts the shape of the annular magnet carriage, it will reduce the efficiency of the electromagnetism induction and restrict the micromation of camera;

Secondly, being a base body, the base and the lens holder should be manufactured in high precision size, furthermore, the shape of the base and the lens holder are complex, so it is very difficult to reach high precision in manufacture and assembling;

Thirdly, the front spring and the rear spring are in offsetting along the same annular orient, so that, when the springs move forward and backward, they will make distortion and generate a force of rotation at the same orient that will cause the rotation and excursion of the lens holder.

Lastly, to assemble the above mentioned lens driving device requires many procedure, and the precision and the capability of the product can be tested only after the assembling is finished, so that the qualification rate of products will not be easy to control efficiently. That will certainly cause the waste of the resource.

SUMMARY OF THE INVENTION

It is an object of the present invention to provide a kind of lens driving device which can enhance the force of electromagnetism induction and can reduce the power supply, and is very beneficial to realize the micromation of the products.

For achieving this object, the lens driving device comprises:

an annular magnet carriage disposed on a base, in the magnet carriage at least one magnet and at least one coil are disposed;

a lens holder for carrying a lens, mounted in the coil, being movable forward and backward in said magnet carriage;

two damping devices resisting the lens movement, respectively disposed at front of and back of said lens holder, to keep the lens holder balanced and stable, when the electromagnetic force generated by the powered coil overcomes the damping force generated by said damping devices, said lens holder is driven to move forward or backward along the optical axis of the lens;

a limiting mechanism disposed between said lens holder and said annular magnet carriage for preventing the lens holder from offsetting and moving;

wherein said annular magnet carriage is externally square-shaped with central circular hole and having a hollowed-U-shaped section, so as to form an externally square-shaped and internally circular-shaped cavity;

while the said magnet being disposed in the corner of said cavity.

The externally square-shaped annular magnet carriage provides sufficient space for the magnets to be respectively disposed in the four corners of the annular magnet carriage. So that the magnets can be made thicker, then the force of electromagnetism induction will be increased, and the micromation of the products will correspondingly be realized. At the same time, the power supply will be reduced and the energy will be saved.

Preferably, said lens holder is a hollowed cylinder with a central hole, a square flange is formed on a rear end of the cylinder, the cylinder has a suitable external diameter to adapt said central circular hole of the annular magnet carriage and can be inserted into said central circular hole of the annular magnet carriage, said square flange fits with a rear edge of the central hole of the annular magnet carriage. Such structure is beneficial to the circumference and axial position for the lens holder and the annular magnet carriage, and is also beneficial to guide the lens holder moving in the central hole of the annular magnet carriage. And as the basic of the assembling precision, the manufacture and assembling process of the lens holder and annular magnet carriage become relatively easier too.

Preferably, said damping devices comprise a front spring with a front gasket in front of said lens holder and a rear spring with a rear gasket in back of said lens holder, and the front gasket is mounted on a front sidewall of the cavity of the annular magnet carriage. Such structure can make the lens holder have the ability of resisting jounce and impact when it moves, and keep in good stability and in good balance all the time to obtain high image quality.

Preferably, said annular magnet carriage, said front gasket, said front spring, said lens holder, said rear spring and said base are all in the shape of flat plate, and nested connect with each other, together to form a positioning mechanism. Such nested connecting structure makes it easy to assemble and to reach the standard precision. Therefore, the examination for the electric characteristics is more convenient and the eligibility rate of products can be increased.

Preferably, the magnet is triangular prism-shaped, and more preferably, four pieces of the magnet are respectively disposed in the four corner of the cavity of the annular magnet carriage. This structure can make the lens driving device have good electric and mechanical characteristics.

Preferably, the positioning mechanism comprises all of the following corresponding grooves: circumferential locating grooves for the annular magnet carriage formed on the inner wall of the central circular hole of the annular magnet carriage, circumferential locating grooves for the front gasket formed on the front gasket, circumferential locating grooves for the front spring formed on the front spring, circumferential locating grooves for the lens holder formed on the lens holder, circumferential locating grooves for the rear spring formed on the rear spring; each said above mentioned groove matches with the locating pin of the assembling jig respectively. Then, the assembling base of the present invention is the frame of the annular magnet carriage, and the locating base of the assembling is the circumferential locating grooves. The front gasket, the front spring, the magnets, the back gasket, the back spring and the base are assembled on the same one assembling jig, as a result, the assembling precision can be increased, the assembling process can be simplified.

Preferably, each kind of following circumferential locating grooves: said circumferential locating grooves for the annular magnet carriage, said circumferential locating grooves for the front gasket, said the circumferential locating grooves for the front spring, said the circumferential locating grooves for the lens holder, and said circumferential locating grooves for the rear spring, has four grooves located equably along the circumference, to prevent the lens holder offsetting and moving.

Preferably, said limiting mechanism comprises a plurality of openings formed on the inner wall of said central circular hole of the annular magnet carriage and a plurality of longitudinal ribbed arches formed on the outer wall of said lens holder, and the openings and ribbed arches are respectively adapted to each other, to further prevent the lens holder and the annular magnet carriage offsetting when they work.

Preferably, said front spring is a square sheet with a hole formed in the center and a plurality of spring strings symmetrically formed around the hole, the spring strings of the front spring and the spring strings of the rear spring are placed symmetrically, so that, the circumferential force generated by the spring strings of the front spring and the circumferential force generated by the spring strings of the rear spring will be balanced out each other when the spring strings distort along the optical axis, that will prevent the lens holder offsetting circumferentially.

Preferably, the front spring is located between the front gasket and the magnet, to keep in better stability and in better balance when the lens holder moves forward.

Preferably, the number of the openings on the annular magnet carriage and the number of the ribbed arches on the lens holder are respectively four, the openings and the ribbed arches are respectively disposed centrosymmetrically to make both the annular magnet carriage and the lens holder better positioned circumferentially.

Preferably, said front portion of the lens holder joints with said front spring in the following better position manner: each said ribbed arch has a project portion, and each said front spring has a corresponding concave portion receiving said project portion. Similarly, said rear spring is preferably a square sheet with a hole formed in the center, and a plurality of spring strings symmetrically formed around said hole, and a plurality of concave portions symmetrically formed on said rear spring which are respectively adapted to the ribbed arches of said lens holder. Such structure make the front spring and the rear spring positioned and fixed relatively to the lens holder, therefore, the circumferential forces generated by the front spring and the rear spring will be eliminated when they move and distort, and then, the circumferential offsetting of the lens holder will be avoid when the lens holder moves along the optical axis.

Preferably, said rear spring is located between said rear gasket and said base to make the lens holder keep in better stability and in better balance when it moves backward, and to obtain high image quality.

Preferably, a limit portion can be formed on said base, which is adapted to the rear portion of said rib arches of the lens holder, to make the lens holder and the annular magnet carriage limited each other, and make the lens holder and the base limited each other too, so as to improve the assembling process.

The structure of the nested seamless connection between said rear gasket and said base can prevent small matter and disturbing light entering into the lens driving device.

Preferably, said coil is cylinder-shaped, and is fixed around the lens holder. Power leads of said coil respectively pass through two locating holes formed on said ribbed arches of the lens holder, and then welded with the spring strings of the rear spring. Acting as an electric terminal, the rear spring welds with power leads from the coil, an electromagnetic force is generated by the coil through which the current passes when powered on drive the lens holder to move forward and backward, then the camera will focus automatically.

Compared with the prior art, the lens driving device of this present invention uses the externally-square-shaped annular magnet carriage as the outer frame and uses the flat nested connection. Therefore not only the lens driving device has good electrical and mechanical capability, but also the assembling process is simplified, the assembling precision is increased, and the eligibility rate of products can be increased too. The lens driving device of this present invention uses special shape and disposing method for the front spring and the rear spring, so that, the circumferential forces on the front spring and the rear spring will be eliminated when they move and distort, therefore, the circumferential offsetting of the lens holder will be avoid when the lens holder moves along the optical axis.

DETAILED DESCRIPTION OF THE INVENTION

Figures 1, 2:
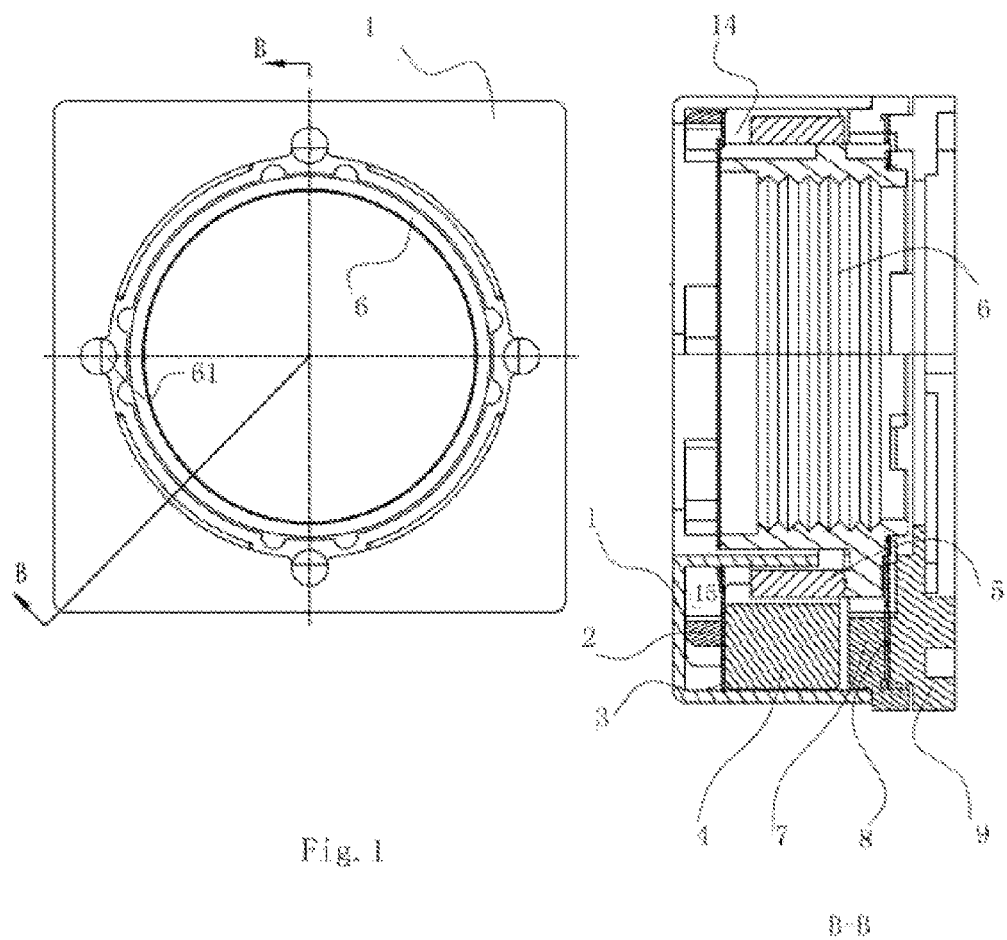
FIG. 1 is a front view of the lens driving device in accordance with an exemplary embodiment of the present invention.
FIG. 2 is the sectional view of B-B way of FIG. 1.
Figure 3:
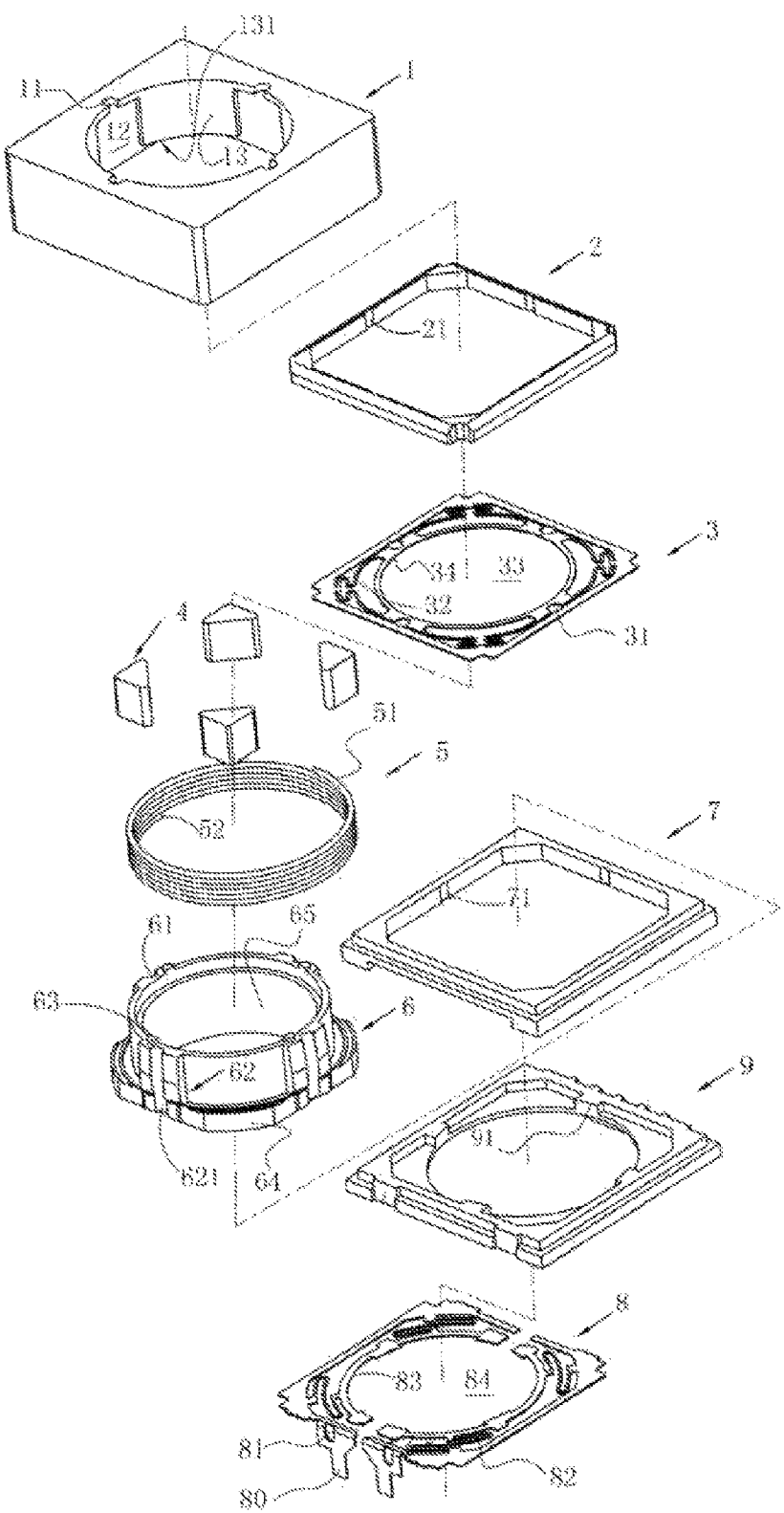
FIG. 3 is an explosive view of the lens driving device in accordance with an exemplary embodiment of the present invention.

To enable a further understanding of the innovative and technological content of the invention herein, refer to the detailed description of the invention and the accompanying drawings below:

FIGS. 1-3 show an embodiment of the present invention.

In this embodiment, the lens driving device comprises an annular magnet carriage 1 which also acts as the outer frame of the lens driving device; the annular magnet carriage 1 is externally square-shaped with a central circular hole 13 and having a hollowed-U-shaped section, forming an externally square-shaped and internally circular-shaped cavity 14; the lens holder 6 is a hollowed cylinder with a central hole 65, a square flange 64 is formed on a rear end of the cylinder, the cylinder has a suitable external diameter to adapt said central circular hole 13 of the annular magnet carriage and can be inserted into said central circular hole 13 of the annular magnet carriage, said square flange 64 fits with a rear edge 131 of said central circular hole 13 of the annular magnet carriage 1.

Four triangular prism-shaped magnets 4 are respectively disposed in the four corners of said cavity 14 of the annular magnet carriage. A front gasket 2 is mounted on a front sidewall 15 of said cavity 14 of the annular magnet carriage, and a front spring 3 is mounted between the front gasket 2 and the magnet 4; while said lens holder 6 rests on the rear side of the magnet 4, and a rear gasket 7 rest on the rear side of the lens holder 6, and the outer edge of the rear gasket 7 nested connects with the bottom edge of the annular magnet carriage 1.

The annular magnet carriage 1 also can be externally polygonal-shaped with a polygonal cavity, so as to meet various lens driving devices. For example, the cavity of the annular magnet carriage 1 can be pentagonal, hexagonal or octagonal, and then the magnets 4 can be placed in the corners of cavity respectively.

While a rear spring 8 rests on the rear side of the rear gasket 7, a base 9 rests on the rear side of the rear spring 8, to locate and press the rear gasket 7, the rear spring 8, the front gasket 2, the magnets 4, the front spring 3 and the lens holder 6 along the optical axis of the lens, as shown in FIG. 2 and FIG. 3. The front spring 3 and the rear spring 8 are designed as a damping device which can make the lens holder 6 have the ability of resisting jounce and impact when it moves and keep in good stability and in good balance all the time to obtain high image quality.

The front spring 3 is a square sheet with a hole 33 formed in the center; a plurality of spring strings 32 symmetrically formed around the hole 33; and a plurality of concave portions 34 which are adapted to the ribbed arches 62 of the lens holder 6 are formed on the front spring 3 symmetrically.

And the front spring 3 is located between the front gasket 2 and the magnet 4.

Similarly, the rear reed 8 is a square sheet with a hole 84 formed in the center; a plurality of spring strings 82 symmetrically formed around the hole 84; and a plurality of concave portions 83 adapted to the ribbed arches 62 of the lens holder 6 are formed on the rear spring 8 symmetrically.

And the rear spring 8 is located between the rear gasket 7 and the base 9.

The lens holder 6 is disposed in the central circular hole 13 of the annular magnet carriage 1, and is supported by the front spring 3 and the rear spring 8. A coil 5 is disposed in the annular magnet carriage 1 and is fixed around the lens holder 6.

Acting as s a electric terminal, the rear spring 8 in the lens driving device welds with power leads of the coil, in the magnetic field formed by the magnet 4 and the annular magnet carriage 1, an electromagnetism force is generated by the powered coil through which the current passes, drive the lens holder 6 to move forward and backward along the optical axis. When the lens holder 6 moves, the front spring 3 and the rear spring 8 will generate a counteractive force, and when the counteractive force and the electromagnetism force are in balance, the lens holder 6 will keep in a predefined position so the camera can focus automatically.

The characters of the structure of the present invention are as bellow:

The annular magnet carriage 1 is externally square-shaped, as shown in FIG. 1 and FIG. 3.

The annular magnet carriage 1 acts as an exterior frame of the lens driving device, it will not only save one component of the frame of device, but also save big space of the device. While the four magnets 4 in the four corners of the annular magnet carriage 1 are all triangular prism-shaped, the thickness of these four magnets 4 will be increased by about 30%, and the magnetic field intensity will be increased. Therefore, much higher electromagnetism force will be generated under the same current, then the power supply will be reduced and the energy consumption will be saved.

The lens holder 6 is a hollowed cylinder with a central hole 65, and the external diameter of said hollowed cylinder is adapting to the central circular hole 13 of the annular magnet carriage; and a square flange 64 is formed on the rear end of the lens holder 6.

The assembling base of the lens driving device is the annular magnet carriage 1. The front gasket 2, the front spring 3, the magnets 4, the reed gasket 7, the rear spring 8 and the base 9 are all nested connected with each other. That is, a plurality of circumferential locating grooves 11 for the annular magnet carriage formed on the inner wall of the central circular hole 13 of the annular magnet carriage, similarly, a plurality of circumferential locating grooves 21 for the front gasket formed on the front gasket 2, a plurality of circumferential locating grooves 31 for the front spring formed on the front spring 3, a plurality of circumferential locating grooves 61 for the lens holder formed on the lens holder 6, a plurality of circumferential locating grooves 71 for the rear gasket 7 formed on the rear gasket 7; as shown in FIG. 2 and FIG. 3.

The circumferential locating grooves 11 for the annular magnet carriage, the circumferential locating grooves 21 for the front gasket, the circumferential locating grooves 31 for the front spring, and the circumferential locating grooves 61, and the circumferential locating grooves 71 for the rear gasket are respectively matching with four locating pin on the assembling jig. Acting as the base of the assembling, all above mentioned locating grooves can be assembled on one assembling jig. It can not only increase the proper alignment of the front gasket, the front spring, the magnets, the back gasket, the back reed and the base, but also can simplify the assembling process and increase the efficiency of manufacture.

In order to make the manufacture and assembling more easily, each kind of following circumferential locating grooves: the circumferential locating grooves 11 for the annular magnet carriage, the circumferential locating grooves 21 for the front gasket, the circumferential locating grooves 31 for the front spring, the circumferential locating grooves 61 for the lens holder, the circumferential locating grooves 71 for the rear gasket, has four grooves disposed centrosymmetrically along the circumference.

In the lens driving device of the present invention, for the annular magnet carriage 1, the front gasket 2, the front spring 3, the rear gasket 7 and the base 9 are designed in the shape of flat plate, and nested connect with each other, mounting feet between the front one and the rear one are not needed. Compare with the prior lens driving device, the structure of the components is simpler, and will make the assembling of the products easier.

Four spring strings 32 are respectively formed on the four corner of the front spring 3 symmetrically, and four spring strings 82 are formed on the four corner of the rear spring 8 symmetrically. Such structure is to make the circumferential force generated by the spring strings of the front spring 3 and the circumferential force generated by the spring strings of the rear spring 8 be balance out each other when the spring strings distort along the optical axis along with the movement of the lens holder 6, that will prevent the lens holder offsetting circumferentially; as shown in FIG. 3.

The limiting mechanism comprises four centrosymmetrically openings 12 formed on the inner wall of the central circular hole 13 of the annular magnet carriage and four longitudinal ribbed arches 62 centrosymmetrically formed on the outer wall of the lens holder 6; the four openings 12 and the four ribbed arches 62 are respectively adapted to each other. That is to prevent the lens holder rotating and prevent the front spring and rear spring being damaged with no additional fixing device for the lens when the lens is installed in the lens holder. So, adjusting focus will become more conveniently for the user.

The front portion of the rib arches 62 of the lens holder matches with the openings 12 of the annular magnet carriage respectively, while the rear portion 621 of the rib arches 62 of lens holder matches with the limit portions 91 of the base respectively, as shown in FIG. 2. That is to make the lens holder 6 and the annular magnet carriage 1, the lens holder and the base both limited each other. Then the damage of jounce and impact to the lens driving device can be avoided.

The magnets 4 are all triangular prism-shaped, and are easy to manufacture, and they will take the most space in the externally square-shaped annular magnet carriage 1. Then the thickness of the magnets 4 can be increased and the magnetic field intensity will be increased. Furthermore, the magnets 4 can rest against the inner wall of the annular magnet carriage 1 when assembling, and then the magnetic resistance in the magnetic circuit will be reduced.

FIG. 3 shows the power leads 51, 52 of the coil 5 respectively go through two holes 61 on the rib arches 62 of lens holder 6 and weld with the spring strings 82 of the rear spring. This structure will avoid the usual shortcomings such as rubbing, leads breaking and short circuit when the lens holder 6 moves.

The coil 5 is cylinder-shaped and is mounted around the lens holder 6. The rib arches 62 of the lens holder can prevent the coil 5 offsetting to ensure the proper alignment when assembling.

As shown in FIG. 3, two terminals 80 located centrosymmetrically on the rear spring 8 is respectively received in two joint portions located centrosymmetrically on the base 9. After finishing assembling the lens driving device, the terminals 80 of the rear spring 8 can be bended to predefined shape using hot-driven rivets, to avoid the high precision requirement of the components if the rear spring 8 bended beforehand, and to make the assembling more easily.

FIG. 3 also shows the jointing structure between the front portion of the lens holder 6 and the front spring 3: the lens holder 6 has a plurality of project portions 63, and the front spring 3 has a plurality of concave portions correspondingly, the project portions and the concave portions are respectively match with each other. Similarly, the rear spring 8 has a plurality of concave portions 83 matching with the corresponding project portions 621 of the lens holder 6, to locate and fix the front spring 3, the rear spring 8 and the lens holder 6, and to prevent the front spring 3 and the rear spring 8 offsetting when assembling.

The assembling of the lens driving device of the present invention uses the assembling jig with four positioning pins in high precision. The process of the assembling is as below:

(1) Putting the circumferential locating grooves 11 for the annular magnet carriage 1 respectively on four positioning pins of said assembling jig;

(2) Putting the circumferential locating grooves 21 for the front gasket 2 respectively on four positioning pins of said assembling jig, and then putting them into the annular magnet carriage 1;

(3) Putting the circumferential locating grooves 31 for the front spring 3 respectively on four positioning pins of said assembling jig, and then putting them into the annular magnet carriage 1;

(4) Inserting four magnets 4 respectively into the four corners of cavity of the annular magnet carriage 1;

(5) Inserting the coil 5 along the ribbed arch 62 of the lens holder 6 and fixing the coil 5 on the seat of the lens holder 6;

(6) Putting circumferential locating grooves 61 for the lens holder respectively on four positioning pins of said assembling jig, and then inserting into the central circular hole 13 of the annular magnet carriage, the coil 5 is located between the magnets 4 and the inner wall of the central circular hole 13 of the annular magnet carriage;

(7) Inserting the rear gasket 7 on the rear edge of the annular magnet carriage 1;

(8) Inserting the rear spring 8 on the rear portion of the rear gasket 7;

(9) Inserting the base 9 on the rear portion of the rear gasket 7;

(10) Bending the two terminals 80 of the rear spring 8 and fixing by hot-driven rivets;

Then the assembling is finished.

The lens driving device are assembled through one assembling jig with four positioning pins in high precision, as a result, the assembling process will be simplified, the proper alignment of components is ensured, and the space between each component is well-proportioned, therefore the eligibility rate of products will be increased.

Such nested connecting structure of this lens driving device will be easy to reach the standard precision. Therefore, the examination of the electric characteristics of qualified products can be carried out before agglutinating, and unqualified products can be re-adjusted, so the qualification rate will be increased.

The process of bending the terminals of the rear spring and fixing by hot-driven rivets after finishing assembling, avoid the very high precision requirement for bending the terminals of the rear spring beforehand, and the assembling becomes more easily.

In this lens driving device of the present invention, the externally square-shaped annular magnet carriage is used as an outer frame and the other components are flat nested connected base on the outer frame. The structure of the nested seamless connection between said rear gasket and said base can prevent small matter and disturbing light entering into the lens driving device and improve the precision remarkably. At the same time, the front gasket and the rear gasket are symmetrical at up and down, and at left and right, which can avoid the rotation offsetting caused by the distortion and prevent the small offsetting of the optical axis when the lens holder is moving. Therefore, the device has good electrical and mechanical characteristics to satisfy the requirement of matching with the miniature sensor to have high precision and high image quality.

In this invention, using the annular magnet carriage as the outer frame of the lens driving device, the space is efficiently utilized, and the outer size can be more smaller in the similar structure; and using the flat nested connection, the assembling precision and the assembling efficiency can be increased, and the shape of the component is simplified, furthermore, the manufacturing for the component and the assembling for the product are improved obviously, and the qualification rate is improved, and the cost of the product is reduced.

What is claimed is:

1. A lens driving device comprising: an annular magnet carriage disposed on a base, in the magnet carriage at least one magnet and at least one coil are disposed; a lens holder for carrying a lens mounted in said coil, being movable forward and backward in said magnet carriage; two damping devices resisting the lens movement respectively disposed at front of and back of said lens holder to keep said lens holder balanced and stable, when the electromagnetic force generated by the powered coil overcomes the damping force generated by said damping devices, said lens holder is driven to move forward or backward along the optical axis of the lens; a limiting mechanism positioning disposed between said lens holder and said annular magnet carriage for preventing said lens holder from offsetting and moving; wherein said annular magnet carriage is externally-square-shaped with a central circular hole and having a hollowed-U-shaped section, so as to form an externally-square-shaped and internally circular-shaped cavity; while said magnet being disposed in the corner of said cavity; said two damping devices comprise a front spring with a front gasket in front of said lens holder and a rear spring with a rear gasket in back of said lens holder, and said front gasket is mounted on a front sidewall of said cavity of the annular magnet carriage.

2. The lens driving device of claim 1, wherein the lens holder is a hollowed cylinder with a central hole, a square flange is formed on a rear end of the cylinder, the cylinder has a suitable external diameter to adapt said central circular hole of the annular magnet carriage and can be inserted into said central circular hole of the annular magnet carriage, said square flange fits with a rear edge of said central circular hole of the annular magnet carriage.

3. The lens driving device of claim 1, wherein said annular magnet carriage, said front gasket, said front spring, said lens holder, said rear spring and said base are all in the shape of flat plate, and nested connect with each other, together to form a positioning mechanism.

4. The lens driving device of claim 3, wherein said positioning mechanism comprises all of the following corresponding grooves: circumferential locating grooves for the annular magnet carriage formed on the inner wall of said central circular hole of the annular magnet carriage, circumferential locating grooves for the front gasket formed on said front gasket, circumferential locating grooves for the front spring formed on said front spring, circumferential locating grooves for the lens holder formed on said lens holder, circumferential locating grooves for the rear spring formed on said rear spring.

5. The lens driving device of claim 4, wherein each kind of following circumferential locating grooves: said circumferential locating grooves for the annular magnet carriage, said circumferential locating grooves for the front gasket, said circumferential locating grooves for the front spring, said circumferential locating grooves for the lens holder, and said circumferential locating grooves for the rear spring, has four grooves located equably along the circumference.

6. The lens driving device of claim 1, wherein said magnet is triangular-prism-shaped.

7. The lens driving device of claim 1, wherein four pieces of said magnet are respectively disposed in the four corners of said cavity of the annular magnet carriage.

8. The lens driving device of claim 1, wherein said limiting mechanism between the lens holder and the annular magnet carriage comprises four openings centrosymmetrically formed on the inner wall of said central circular hole of the annular magnet carriage and four longitudinal ribbed arches centrosymmetrically formed on the outer wall of said lens holder (6); said four openings and said four ribbed arches are respectively adapted to each other.

9. The lens driving device of claim 8, wherein said front spring is a square sheet with a hole formed in the center, a plurality of spring strings symmetrically formed around the hole, and a plurality of concave portions which are respectively adapted to said ribbed arches of the lens holder are formed on said front spring symmetrically.

10. The lens driving device of claim 9, wherein said spring strings of the front spring have four pieces and are located centrosymmetrically on said front spring, said front spring is located between said front gasket and said magnet.

11. The lens driving device of claim 8, wherein said rear spring is a square sheet with a hole formed in the center, and a plurality of spring strings symmetrically formed around said hole, and a plurality of concave portions which are adapted to said of the lens holder are formed on said rear spring symmetrically.

12. The lens driving device of claim 11, wherein said spring strings of the rear spring have four pieces and located on said rear spring centrosymmetrically; and said rear spring is located between said rear gasket and said base.

13. The lens driving device of claim 8, wherein a limit portion is formed on said base, which is adapted to the rear portion of said rib arches of the lens holder.

14. The lens driving device of claim 13, wherein said coil is cylinder-shaped, and is fixed around said lens holder-power leads of the coil respectively pass through two locating holes formed on said ribbed arches of the lens holder, and then welded with said spring strings of the rear spring.

\* \* \* \* \*